US 6,687,121 B1

(12) United States Patent
Chen

(10) Patent No.: US 6,687,121 B1
(45) Date of Patent: Feb. 3, 2004

(54) SWITCH PROTECTION APPARATUS

(75) Inventor: Kuei-Hsiung Chen, Hsinchu (TW)

(73) Assignee: Mitac Technology Corp., Taoyuan (TW)

( * ) Notice: Subject to any disclaimer, the term of this patent is extended or adjusted under 35 U.S.C. 154(b) by 0 days.

(21) Appl. No.: 10/065,875

(22) Filed: Nov. 27, 2002

(51) Int. Cl.⁷ .............................. H05K 5/00; G06F 1/26
(52) U.S. Cl. ........................ 361/686; 713/300
(58) Field of Search ............................... 361/600, 683, 361/686, 726, 727, 732, 747, 759; 713/300, 310, 320, 323, 340

(56) References Cited

U.S. PATENT DOCUMENTS

| | | | | |
|---|---|---|---|---|
| 5,450,271 A | * | 9/1995 | Fukushima et al. | 361/686 |
| 5,751,547 A | * | 5/1998 | Honda et al. | 361/686 |
| 6,049,045 A | * | 4/2000 | Becker et al. | 200/51 R |
| 6,092,205 A | * | 7/2000 | Han | 713/300 |
| 6,181,552 B1 | * | 1/2001 | Neville et al. | 361/686 |
| 6,243,819 B1 | * | 6/2001 | Jung | 713/320 |
| 6,577,501 B2 | * | 6/2003 | Lin | 361/686 |

* cited by examiner

Primary Examiner—Matthew V. Nguyen
(74) Attorney, Agent, or Firm—Jiang Chyun IP Office

(57) ABSTRACT

A switch protection apparatus, having a switch, which is a slidable power switch to turn on and off the power source. The switch has a retainer ring mounted at a periphery of the switch in a portable computer to encircle the switch. The retainer is rotatable and has an opening for locking the switch and preventing the switch from being turned on accidentally. When the retainer is rotated to an open position, the opening is aligned with the slidable path of the switch, such that the switch can slide through the opening to turn on or off the power source. When the retainer ring is rotated away from the open position, the switch cannot slide through the retainer ring to turn on or off the power source.

6 Claims, 4 Drawing Sheets

SWITCH PROTECTION APPARATUS

BACKGROUND OF INVENTION

1. Field of the Invention

The present invention relates in general to a switch protection apparatus, and more particularly, to a protection apparatus for the power switch suitable for use in a portable computer.

2. Description of the Related Art

In prior art, the data being processed in the computer is easily lost or the computer lifetime is easily shortened when the power is accidentally switched off, or the user mistakenly touches some key. The portable computer is normally light and thin, and so, of course, portable. This mobility also increases the possibility of unintentionally turning on or off the power off switch. This problem is even more serious when the computer is vibrated or falls.

FIG. 1 shows a conventional power switch of a portable computer.

The portable computer 100 has a switch 110, which is a power switch. The switch 110 is pushed to one side for turning on the power, and to the other side for turning off the power. Therefore, the switch 110 of the portable computer 100 is easy to abnormally turn on or off the power due to a unexpected collision or vibration.

To avoid abnormal on and off action of the switch of the portable computer caused by collisions, vibrations and falls, an apparatus for protecting the switch of the computer is required.

SUMMARY OF INVENTION

The present invention provides a switch protection apparatus that uses a C-shape annular retainer ring to retain the switch. Only when the retainer ring is rotated to a certain position, can the switch be slid to turn on or off the power.

The switch protection apparatus provided by the present invention comprises a switch, which is a power switch, and a retainer ring. The switch is slidable along a path to turn on or off the computer. The retainer ring is mounted at a periphery of the switch to encircle the switch. The retainer ring is rotatable and comprises an opening. When the retainer ring is rotated to an open position, the opening is aligned with the slidable path of the switch, which is then slidable to turn on or off the power. When the retainer ring is rotated away from the open position, the switch is locked and cannot slide through the retainer ring, such that the power cannot be turned on or off thereby.

BRIEF DESCRIPTION OF DRAWINGS

The above objects and advantages of the present invention will be become more apparent by describing in detail exemplary embodiments thereof with reference to the attached drawings in which.

DETAILED DESCRIPTION

First Embodiment

Figure 1:
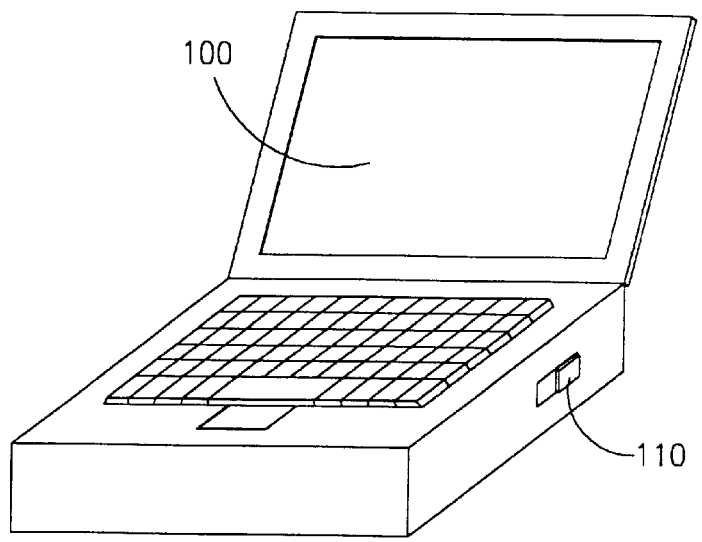
FIG. 1 shows a conventional power switch of a portable computer.
Figure 2A:
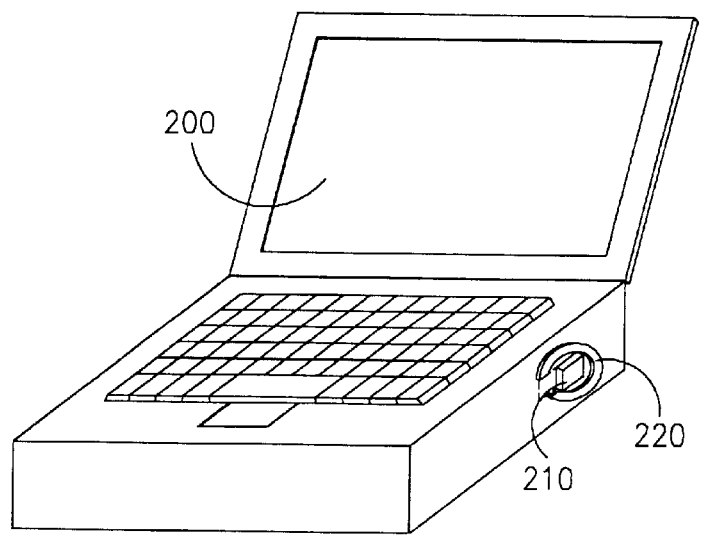
FIG. 2A shows a switch protection apparatus in a first embodiment of the present invention.

The present invention provides a switch protection apparatus to prevent a user from mistakenly switching on or off the power source. FIG. 2A shows the switch protection apparatus of a portable computer in a first embodiment of the present invention.

The portable computer 200 comprises a switch 210, which is a power switch. The switch 210 is slidable along a path to switch on or off the power of the portable computer 200. At a periphery of the switch 210, a retainer ring 220 is installed to encircle the switch 210. The retainer ring 220 is preferably a C-shaped annular ring and is rotatable around the switch 210.

Figure 2B:
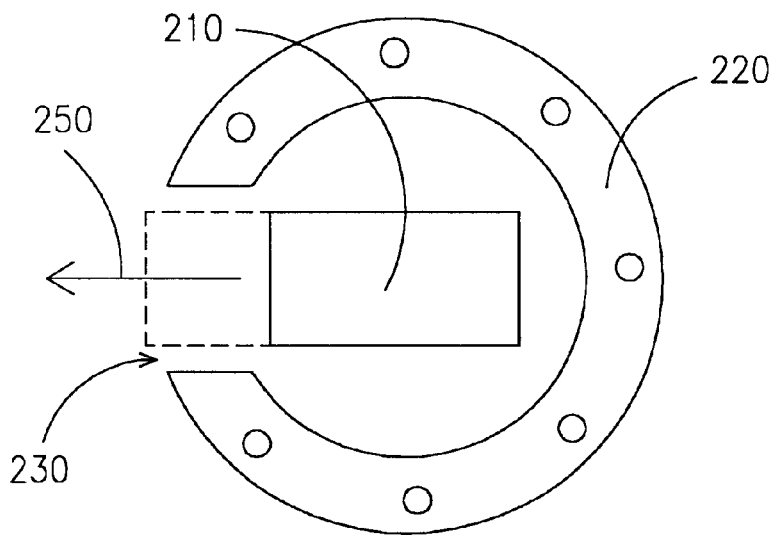
FIG. 2B shows the switch protection apparatus as shown in FIG. 2A having a retainer ring rotated to an open position.

FIG. 2B shows a schematic drawing of the switch protection apparatus when the retainer ring 220 is rotated to an open position 250. The retainer ring 220 has an opening 230. When the retainer ring 220 is rotated to an open position 250, the opening 230 is aligned with a slidable path of the switch 210, such that the switch 210 can be slid forth through the opening 230 to turn on the power source, or slid back through the opening 230 to turn off the power source.

Figure 2C:
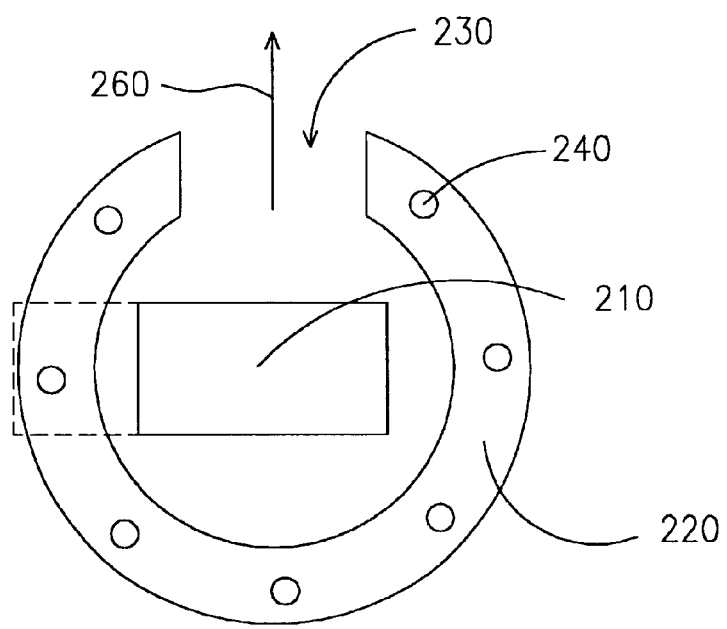
FIG. 2C shows the switch protection apparatus as shown in FIG. 2A having the retainer ring rotated to a locked position.

FIG. 2C shows a schematic drawing of the switch protection apparatus when the retainer ring 220 is rotated to a locked position 260. When the retainer ring 220 is rotated to a locked position 260, the opening 230 is not aligned with the slidable path, such that the switch 210 cannot be slid through the retainer ring 220 and is locked thereby. Therefore, the switch 210 is retained within the retainer ring 220, and the computer will not be abnormally switched on due to any external force. The retainer ring 220 further comprises a plurality of protrusions 240 distributed thereon. When the user is trying to rotate the retainer ring 220, the friction between the retainer ring 220 and the user is increased by the protrusions 240, such that the user can easily operate the retainer ring 220 to a required position.

Second Embodiment

Figure 3A:
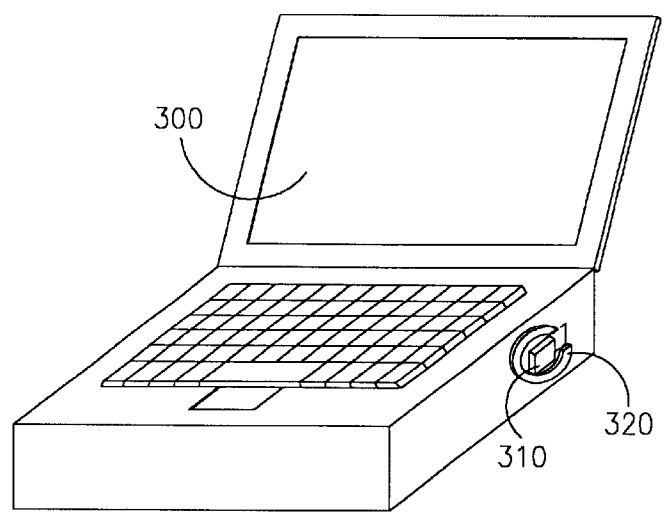
FIG. 3A shows a switch protection apparatus in a second embodiment of the present invention.

The present invention provides a switch protection apparatus to prevent a user from mistakenly switching on or off the power source. FIG. 3A shows the switch protection apparatus of a portable computer in a second embodiment of the present invention.

The portable computer 300 comprises a switch 310, which is a power switch. The switch 310 is slidable along a path to switch on or off the power of the portable computer 300. At a periphery of the switch 310, a retainer ring 320 is installed to encircle the switch 310. The retainer ring 320 is preferably in a C shape and is rotatable around the switch 310.

Figure 3B:
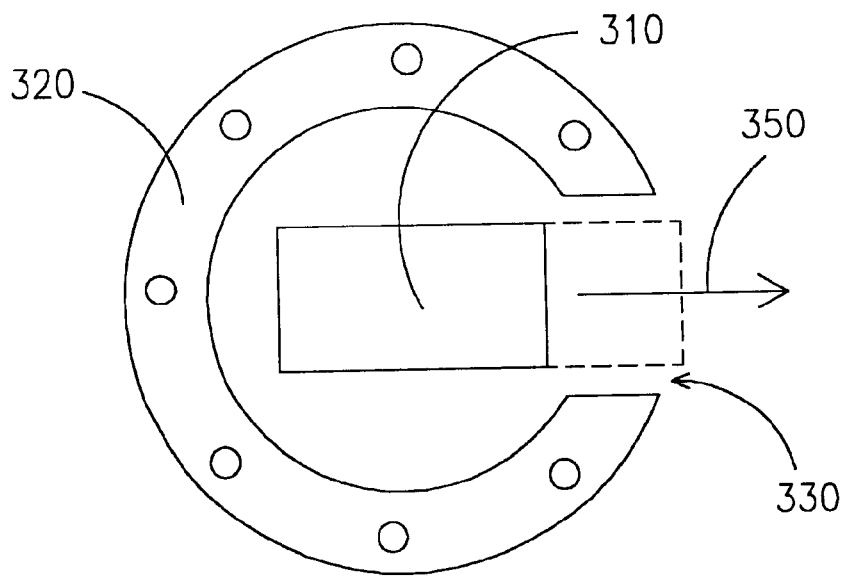
FIG. 3B shows the switch protection apparatus as shown in FIG. 3A having a retainer ring rotated to an open position.

FIG. 3B shows a schematic drawing of the switch protection apparatus when the retainer ring 320 is rotated to an open position 350. The retainer ring 320 has an opening 330. When the retainer ring 320 is rotated to an open position 350, the opening 330 is aligned with a slidable path of the switch 310, such that the switch 310 can be slid forth through the opening 330 to turn off the power source, or slid back through the opening 330 to turn on the power source.

Figure 3C:
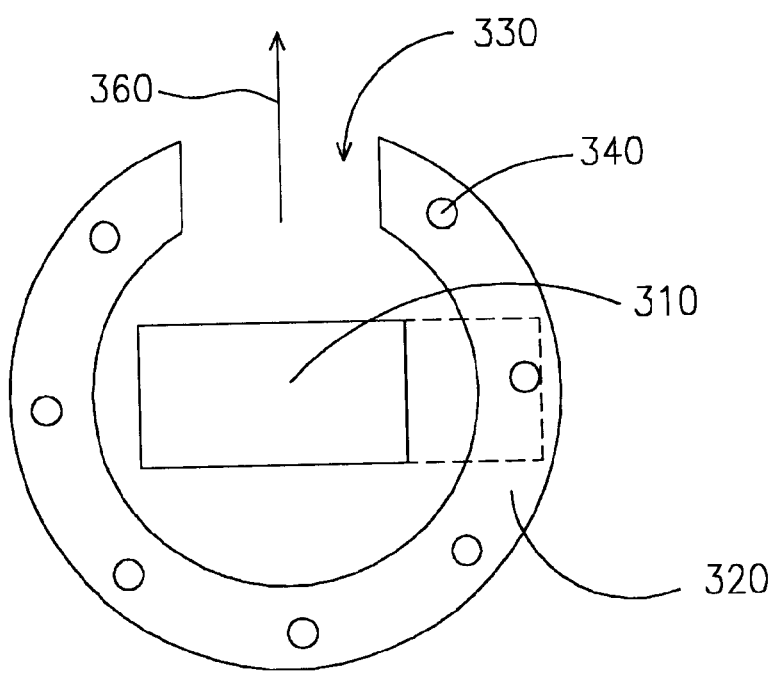
FIG. 3C shows the switch protection apparatus as shown in FIG. 3A having the retainer ring rotated to a locked position.

FIG. 3C shows a schematic drawing of the switch protection apparatus when the retainer ring 320 is rotated to a locked position 360. When the retainer ring 320 is rotated to a locked position 360, the opening 330 is not aligned with the slidable path, such that the switch 310 cannot be slid through the retainer ring 320 and is locked thereby. Therefore, the switch 310 is retained within the retainer ring 320, and the computer will not be abnormally switched off due to any external force. The retainer ring 320 further comprises a plurality of protrusions 340 distributed thereon. When the user is trying to rotate the retainer ring 320, the friction between the retainer ring 320 and the user is increased by the protrusions 340, such that the user can easily operate the retainer ring 320 to a required position.

According to the above, the switch protection apparatus in the first embodiment avoids abnormal power on action of the computer, while the switch protection apparatus in the second embodiment avoids abnormal power off condition of the computer. Only when the retainer ring is rotated to the open position, can the power source be switched on or off. In contrast, when the retainer ring is rotated to the locked position, the computer is constantly on or off without being affected by external forces such as unexpected collisions, impacts or falls. The present invention thus provides at least the following advantages:

(1) When the retainer ring is rotated to a locked position, and the switch retained in the retainer ring is in an off position, the portable computer is prevented from being switched on by any external force.
(2) When the retainer ring is rotated to a locked position, and the switch retained in the retainer ring is in an on position, the portable computer is prevented from being switched off by any external force.
(3) The installation of the protrusions on the retainer ring increases the friction between the user and the retainer ring, such that it is easier for the user to rotate the retainer ring.

While the present invention has been particularly shown and described with reference to preferred embodiments thereof, it will be understood by those of ordinary skill in the art that various changes in form and details may be made therein without departing from the spirit and scope of the present invention as defined by the appended claims.

What is claimed is:

1. A switch protection apparatus, suitable for use in a portable computer, comprising:
   a switch, being a power switch and operative to slide along a slidable path for turning on and off a power source; and
   a retainer ring, installed at a periphery of the switch to encircle the switch, wherein the retainer ring comprises an opening and is rotatable between an open position and a locked position, when the retainer ring is rotated to the open position, the opening is aligned with the slidable path allowing the switch to slide through the opening for turning on the power source, and when the retainer ring is rotated to the locked position, the opening is unaligned with the slidable, the switch is retained within the retainer ring, and the power source is maintained off.

2. The switch protection apparatus as claimed in claim 1, wherein the retainer ring includes a C-shaped annular ring.

3. The switch protection apparatus as claimed in claim 1, wherein the retainer ring further includes a plurality of protrusions.

4. A switch protection apparatus, suitable for use in a portable computer, comprising:
   a switch, being a power switch and operative to slide along a slidable path for turning on and off a power source; and
   a retainer ring, installed at a periphery of the switch to encircle the switch, wherein the retainer ring comprises an opening and is rotatable between an open position and a locked position, when the retainer ring is rotated to the open position, the opening is aligned with the slidable path allowing the switch to slide through the opening for turning off the power source, and when the retainer ring is rotated to the locked position, the opening is unaligned with the slidable, the switch is retained within the retainer ring, and the power source is maintained in an on state.

5. The switch protection apparatus as claimed in claim 4, wherein the retainer ring includes a C-shaped annular ring.

6. The switch protection apparatus as claimed in claim 1, wherein the retainer ring further includes a plurality of protrusions.

* * * * *